(12) United States Patent
Olarig et al.

(10) Patent No.: US 6,609,204 B1
(45) Date of Patent: Aug. 19, 2003

(54) METHOD AND APPARATUS FOR LOCKING/UNLOCKING VIA PLATFORM MANAGEMENT BUS

(75) Inventors: Sompong P. Olarig, Cypress, TX (US); Michael F. Angelo, Houston, TX (US); Chi Kim Sides, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/280,314

(22) Filed: Mar. 29, 1999

(51) Int. Cl.[7] ............................ H04L 9/00; G06F 13/38; H04M 11/04

(52) U.S. Cl. ......................................... 713/200; 713/201

(58) Field of Search ................................ 713/200, 201, 713/202; 340/825.31, 310.01

(56) References Cited

U.S. PATENT DOCUMENTS

| | | | |
|---|---|---|---|
| 4,426,862 A | 1/1984 | Yamada et al. | |
| 4,937,560 A | 6/1990 | Nourmand | |
| 4,970,504 A | 11/1990 | Chen | |
| 5,162,976 A | 11/1992 | Moore et al. | |
| 5,172,967 A | 12/1992 | Pipe | |
| 5,397,176 A | 3/1995 | Allen et al. | |
| 5,560,024 A | 9/1996 | Harper et al. | |
| 5,606,615 A | 2/1997 | Lapointe et al. | |
| 5,982,894 A * | 11/1999 | McCalley et al. | 380/9 |
| 6,363,449 B1 * | 3/2002 | Sides et al. | 710/129 |
| 6,463,495 B1 * | 10/2002 | Angelo et al. | 710/305 |

FOREIGN PATENT DOCUMENTS

JP 03158581 * 7/1991

* cited by examiner

Primary Examiner—Ly V. Hua

(57) ABSTRACT

A computer system and method in which an electrically controlled "hoodlock," which prevents the computer's chassis from unauthorized opening, can be remotely accessed through powerline communications.

51 Claims, 7 Drawing Sheets

METHOD AND APPARATUS FOR LOCKING/UNLOCKING VIA PLATFORM MANAGEMENT BUS

The present invention relates to a method of theft protection for computers and/or computer related hardware and to data communication, particularly to theft protection via communication between components in computer chassis across a network.

BACKGROUND

High-Tech Equipment Theft

Physical computer equipment, and intellectual property stored on hard drives in computer systems, can be worth millions of dollars to the owner companies. Asset management is becoming very difficult, particularly where small, expensive, and portable computers are involved.

As computers have become more common, theft of the computers, of their components, and of information stored on them has become more prevalent. Employees continue to be the primary source for losses due to theft. For example, employees who have compatible systems at home may be tempted to swap boards and input devices at work to repair those systems. Employees are not the only threat. Repairmen, janitors, delivery-persons, other contractors, customers, invited guests, and even security people themselves have an opportunity to take computer property.

Size and portability are also factors. As integrated circuit manufacturers reduce the size of chips with a corresponding boost in performance and power, the boxes into which the chips are placed become smaller. Grab-and-run thefts are likely to focus on the smallest equipment. As computer equipment continues to decrease in size (e.g., to sub-notebook and smaller computers), the vulnerability of this equipment to theft increases.

The increasing use of plug-and-play and hot-swappable units has been helpful for thieves. These architectures have accelerated moves toward modular components. Such components can be quickly attached or removed from a system.

Computers and related peripherals and intellectual property are not the only targets of high-tech theft. State-of-the-art instrumentation and test equipment are also prime candidates and are usually more expensive per unit volume than a typical home computer. Although less marketable than computer equipment, they can represent a sizeable loss to companies which use such equipment.

However, the biggest loss due to theft is likely to be in the value of the information. Computers, boards, hard drives, and peripherals are replaceable. In many cases an organization may have its own servicing department that can replace a missing part within minutes. Confidential information or intellectual property such as trade secrets or computer code is much more difficult, sometimes impossible, to replace. Further, economic damage to an organization may result if the information contained in a stolen piece of hardware is used by a competitor.

BACKGROUND

Conventional Chassis Locks

Conventional desktop units currently include a mechanical lock of some sort. Such a lock allows the chassis to be opened with a key or a special tool. This approach presents a dilemma: if the special tool is exotic, it adds to the cost of a technician's toolbox and increases the likelihood that a technician may not have the proper tool when he needs it; if the special tool is too common, the risk is that thieves will have it, too. In many current systems, the special tool is simply a number 8 Torx™ driver, which is very widely available.

For systems which rely on key-lock, key management is a significant issue. In today's world of large corporate networks, such a setup would be extremely cumbersome for Information Management departments managing thousands of machines. Whenever service is required, the correct key has to be identified or the systems have to be left unlocked.

BACKGROUND

Compatibility

Over the years, communications technology has developed for the computer industry into what is now extensive sophistication in hardware and software systems for facilitating various types of communications. Nevertheless, extensive sophistication and advancements in many hardware and software systems can be thwarted from market or commercial applicability for many reasons. For example, if a new communications system is not compatible with an existing system, many users will not purchase the new system. Attempts for a single manufacturer to become the system to which all others must be compatible can be quite difficult to achieve and, even if successful, cost the manufacturer a great deal of investment capital. Attempts for different manufacturers to interface with each other often creates complex and expensive systems which can confuse system purchasers and installers alike, and can often making the problems worse. Also, manufacturers of systems are reluctant to develop or introduce new systems to the market when compatibility and user confusion are such big issues. Accordingly, compatibility with other existing or even future systems has been emphasized in various industries. Industry standards to accomplish compatibility goals of the data communication systems have resulted.

Despite the advancements of compatibility which result when particular industries adopt standards, another problem arises when an industry desires to change or make a transition to new standards. These new standards, for example can often provide higher speed capabilities or other significant improvements over previous standards. The new standards, however, often are not adopted because the new standard is not compatible with the existing standard. In other words, the market will not accept or is reluctant to accept, the new standard because it may require replacement of all existing systems with which the user wants to communicate. This can cause technology stagnation and inhibit rapid advancement of technology.

BACKGROUND

Home Automation Standards

Home automation systems have long used special techniques for local communication over power mains. This was originally necessitated by the absence of any other type of bus over which "smart" devices could "talk" to each other. However, communication over power mains also introduces very specific problems, including those of line noise received from motors and other devices attached to the power mains, the need to ensure that the data itself does not interfere with other devices connected to the mains, and limited bandwidth. For similar reasons, low-bandwidth power-mains communications have also been used for limited data communications between smart devices and local electric utility control systems.

One example of an industry standard for building or home automation data communication systems has been the X10 or X-10 communications protocol for remote control of electrical devices which communicate across standard wiring or power lines of a building such as a home. (In general, methods of ensuring the accuracy of transmitted and received data are known as communications protocols.) The X10 communications protocol allows various home electronic devices, such as lighting controllers or switches, status indicators, security systems, telephone interfaces, computer interfaces, and various home appliances, to readily be linked together for simple control applications. The X10 communications protocol generally has a narrow bandwidth, i.e., 120 KiloHertz ("KHz"), for communicating data at a relatively slow speed, i.e., 60 bits/second.

Another industry standard for home automation has been the Consumer Electronic Bus ("CEBus") standard, which describes a local communications and control network designed specifically for the home. Like X10, the CEBus standard provides a standardized communication facility for exchange of control information and data among various devices and services in the home, such as lighting controllers or switches, status indicators, security systems, telephone interfaces, computer interfaces, stereo systems, and home appliances. The CEBus standard was developed by the Consumer Electronics Group of the Electronic Industries Association ("EIA") and an inter-industry committee of representatives from both EIA and non-member companies. The CEBus standard generally has a wide bandwidth, e.g. 100–400 KHz, for communicating data at a relatively fast speed, i.e., 10 Kilobits/second and is significantly faster and more reliable than the X10 communications protocol. The CEBus standard also allows full networking of consumer application devices. The CEBus standard encompasses both the physical media (wires, fiber, etc.) and the protocol (software) used to create an intelligent home or office.

The newest standard for home automation is the EIA-600 standard, which is intended to handle existing and anticipated control communication requirements at minimum practical costs consistent with a broad spectrum of residential applications. It is intended for such functions as remote control, status indication, remote instrumentation, energy management, security systems, entertainment device coordination, etc. These situations require economical connection to a shared local communication network carrying relatively short digital messages.

BACKGROUND

Platform Management

Presently, there are different types of data transmission systems which allow computer network components to be automatically controlled and monitored at a distance. These known systems are generally connected by a dedicated network, and consist of individual control and monitoring modules at each node, which are in turn managed by a central system.

The Intelligent Platform Management Interface (or "IPMI") specification was announced by Intel, Dell, Hewlett-Packard Company, and NEC to provide a standard interface to hardware used for monitoring a server's physical characteristics, such as temperature, voltage, fans, power supplies and chassis.

The IPMI specification defines a common interface and message-based protocol for accessing platform management hardware. IPMI is comprised of three specifications: Intelligent Platform Management Interface, Intelligent Platform Management Bus (IPMB) and Intelligent Chassis Management Bus (ICMB). The IPMI specification defines the interface to platform management hardware, the IPMB specification defines the internal Intelligent Platform Management Bus, and the ICMB specification defines the external Intelligent Chassis Management Bus, an external bus for connecting additional IPMI-enabled systems.

IPMI provides access to platform management information. IPMI-enabled servers monitor and store platform management information in a common format which can be easily accessed by server management software, add-in devices or even directly from other servers.

A management bus, IPMB, allows add-in devices such as Emergency Management Cards to access platform management information, even if the processor is down. The IPMB can also be extended externally to the chassis (ICMB) to enable "system-to-system" monitoring. This allows a server to manage another ICMB-connected server even if it has no system management software or the processor is down.

Functions such as failure alerting, power control and access to failure logs are supported for systems connected to the ICMB, so multiple servers or peripheral chassis (storage and power supplies) can connect to the ICMB as an alternative to using Emergency Management Cards.

IPMI allows differentiated hardware solutions to be implemented quickly and easily. The IPMI interface isolates server management software from hardware, enabling hardware changes to be made without impacting the software. Although IPMI is not tied to a specific operating system or management application, it is complementary to higher level management software interfaces such as the Simple Network Management Protocol (SNMP), Desktop Management Interface (DMI), Common Information Model (CIM), and Windows Management Interface (WMI), which facilitate the development of cross platform solutions.

IPMI allows system managers to determine the health of their server hardware, whether the server is running normally or is in a nonoperational state. Servers based on IPMI use "intelligent" or autonomous hardware that remains operational even when the processor is down so that platform management information is always accessible. The IPMI interfaces enable platform management hardware to be accessed not only by management software but also accessed by third party emergency management add-in cards and even other IPMI-enabled servers. System-to-system monitoring or management via a connected server is becoming increasingly important as system managers deploy complex system topologies such as clusters and rack-mounted configurations. In addition, the scalable nature of IPMI enables the architecture to be deployed across a server product line, from entry to high-end servers, and gives system managers a consistent base of platform management functionality upon which to effectively manage their servers. One specific disadvantage of this approach is that additional physical connections and device support is required to interconnect these components.

Hood Lock and Unlock Using Intrachassis and Interchassis Communication

The present application discloses a system and method of operating an electrically controlled "hoodlock," which prevents the computer's chassis from being opened unless a computer opens the hoodlock. The system is equipped with an electronic hood lock used to prevent removal of the computer's cover. The lock is controlled electronically. By allowing a computer to protect its or another computer's physical access, greater flexibility in optimizing access security is obtained. According to the preferred embodiment, the hoodlock is operated by command and control communications from a system manager across a secondary network, using a communications protocol, for example, the CEBus protocol or the CEBus protocol modified for a particular network, such as a power mains. The command and control information provides signals to both lock and unlock the hood lock solenoid.

An advantage of interchassis locking is that the chassis of a computer can be unlock or locked using a secondary network even when the primary network is down.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
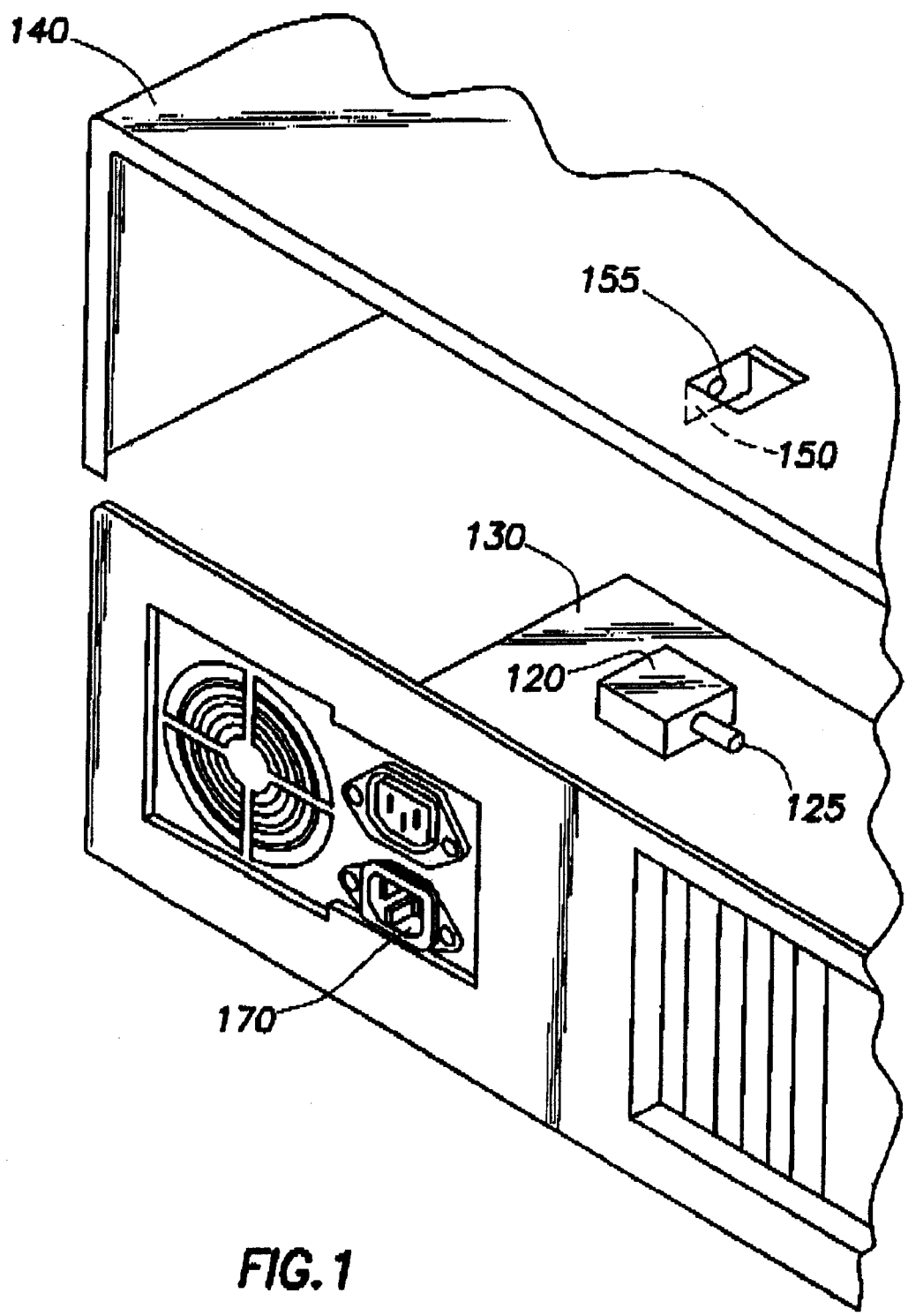
FIG. 1 shows the physical configuration of the computer with the case opened.

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

This application shares some text and figures with the following US applications, which all have an effective filing date simultaneous with that of the present application and hereby incorporated by reference: application Ser. No. 09/280,313 now U.S. Pat. No. 6,363,449, application Ser. No. 09/293,587, and application Ser. No. 09/280,311 now U.S. Pat. No. 6,463,495.

Definitions:

Following are short definitions of the usual meanings of some of the technical terms which are used in the present application. (However, those of ordinary skill will recognize whether the context requires a different meaning.) Additional definitions can be found in the standard technical dictionaries and journals.

Definitions:

Following are short definitions of the usual meanings of some of the technical terms which are used in the present application. (However, those of ordinary skill will recognize whether the context requires a different meaning.) Additional definitions can be found in the standard technical dictionaries and journals.

X-10 is the oldest and most widely-used home automation protocol. It uses the power lines as a transmission medium. LonWorks Echelon Corporation developed this standard for both home and industrial use, and the standard may be obtained from that company. LonWorks uses a variety of transmission media including IR, RF, coaxial cable, and twisted pair.

IEEE 1394 is a communications standard which supports real-time audio and video transmission with data rates up to 400 Megabits/sec. IEEE 1394 uses a cable consisting of three twisted pairs to connect devices in a network. The IEEE 1394 standard, which is hereby incorporated by reference, is published by, and available from, the IEEE.

CEBus is a newer standard in home automation. Like LonWorks, CEBus uses a variety of transmission media including IR, RF, coaxial cable, and twisted pair. The CEBus standard, which is hereby incorporated by reference, is published by, and available from, the Electronic Industries Association.

USB (or the Universal Serial Bus) was originally intended for use as a home automation protocol. However, it was actually developed as a protocol for computer peripherals by several manufacturers of personal computer products. The USB specification is available, as of the filing date of this application, from the USB Implementer's Forum at http://www.usb.org, and is hereby incorporated by reference.

Power rail refers to any one of the connections which provide power to each of the internal system components of a computer system. The power rail generally receives power from the system power supply, which itself is powered by a battery or an external power source.

Power mains refers to the power mains systems in common use in all industrialized countries. In the United States, for example, this would refer to the common indoor power outlets which supply current at 60 Hz and (for most circuits) about 120 V; in the U.K. this would refer to the common indoor power outlets which supply current at 50 Hz and 240 V.

Intrachassis refers to components of a computer system connected to a common power rail and, typically, located within a common system unit. In the context of this application, "intrachassis" includes system devices that may be physically located outside the system unit bus, but which are still powered by the common power rail, e.g., an external hard drive.

According to the preferred embodiment, a network of computer systems is provided in which a "smart" device, such as a hood lock, within each system is capable of communicating with other smart devices over the system power rail, and between devices on different computer systems over a common power mains.

The Hood Lock

In the presently preferred embodiment, the hood lock operates by moving a solenoid, which is connected to a locking arm, into or out of a slot attached to the system's hood. When the locking arm is in the slot, the hood cannot be removed. A "lock" pulse will cause the locking arm to move into the slot. An "unlock" pulse causes the locking arm to retract from the slot, which frees the hood for removal.

In the presently preferred embodiment, The hardware control for the hood lock features a programmable hardware timer designed to prevent solenoid damage from lock/unlock pulses of excessive duration. In addition, the controlling software is freed from having to control the pulse width.

FIG. 1 shows the physical configuration of a computer with the case opened, showing a solenoid 120, with a plunger 125 above the power supply 130. The hood 140 has an added tab 150 with a hole 155 in it. When the hood is in place, the solenoid plunger 125 extends through this hole 155 to lock the hood in position.

Intrachassis and Interchassis Communication

The presently preferred embodiment will be described in the context of a system which uses power-line communications to provide both intrachassis and interchassis communications. However, as will be apparent to technologists of ordinary skill, the claimed inventions do not necessarily require such extensive reliance on power-line communications.

Description of Exemplary Node

Figure 6:
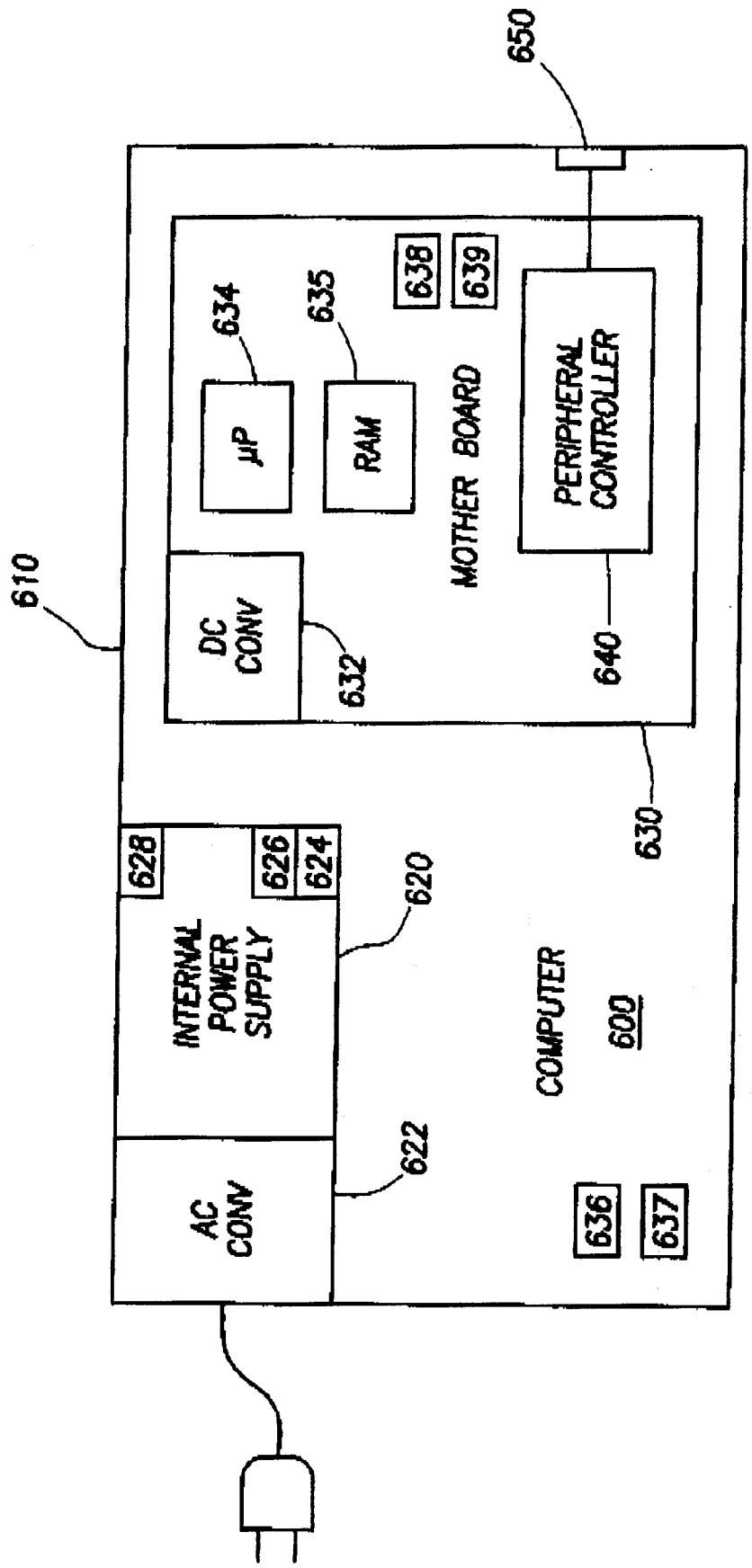
FIG. 6 shows a sample electrical configuration of some important parts of a computer according to the preferred embodiment which includes a "hoodlock" 650.

FIG. 6 shows a sample electrical configuration of some important parts of a computer 600 which includes a "hoodlock" 650. The case 610 encloses the motherboard 630 and power supply 620, as well as other components, such as a hard disk drive 636, a removable media drive 637, and many other possible components, not shown, such as I/O channel interfaces, and option cards if present. The motherboard 630 includes many key components of the computer. For example, the motherboard carries one or more microprocessors (or other processing units) 634, RAM 635, and a peripheral controller 640, as well as many others which are not shown. Also mounted on the motherboard may be a temperature sensor 638 or cooling device 639, for example, a fan.

The power supply 620 preferably includes an AC converter 622, which permits power to be drawn from an AC power line, and provides power to a DC converter 632 on the motherboard. Further, the power supply preferably includes a cooling device 624 (a fan, for example) and a temperature sensor 626.

According to the preferred embodiment, the power supply incorporates a microcontroller 628 and non-volatile memory for storing a boot-up program, which is connected to the system power rail, and is capable of communicating with other devices incorporating similar microcontrollers, for example, the peripheral controller 640, over the power rail. According to the preferred embodiment, this communication is done according to the CEBus specification or modifications thereof, described above.

The exemplary functions below will be described with particular reference to the microcontroller 228 of the power supply, but it will be understood by those skilled in the art that the similar controllers in other system devices will function and communicate similarly. Moreover, when reference is made to any specific component communicating with another over the power rail, it will be understood that this is accomplished by use of the respective microcontrollers of those components.

In this embodiment, various system devices, including the temperature sensor 638, the cooling device 639, and the hard disk drive 636, are connected to send and receive signals over the power rail. In this manner, the controller 628 in the power supply can communicate with these system devices. Further, the system peripheral controller can be connected to communicate over the power rail.

Particular communications supported by the controller 628 include the ability to request basic status information from each device, and to command the devices to power on or off as needed. For example, the controller 628 may receive information from temperature sensor 638 indicating a high temperature, and may command cooling device 639 to turn on or adjust speed in response.

In this context, hoodlock HL is connected to the power rail 270. Hoodlock HL is positioned to engage the door or cover of the system case, so that it is fastened shut unless the hoodlock solenoid is activated.

Further, each system device has an associated identifier address which uniquely identifies that device within the system. The identifier functions to specifically identify both the type of device and the specific address of that device within devices of that type. This identifier is used to specifically identify the sender and recipient of any data or command sent over the system power rail.

This identifier is particularly advantageous when used to determine which device types are authorized to perform certain functions or to send certain commands. For example, while it may be useful for a temperature sensor, upon detection of an overheating condition, to order the power supply to shut the system down, there is almost no reason for a hard disk drive to request a system shut-down. By identifying the class of device from which a command is sent, the receiver can determine whether or not to respond.

Figure 2:
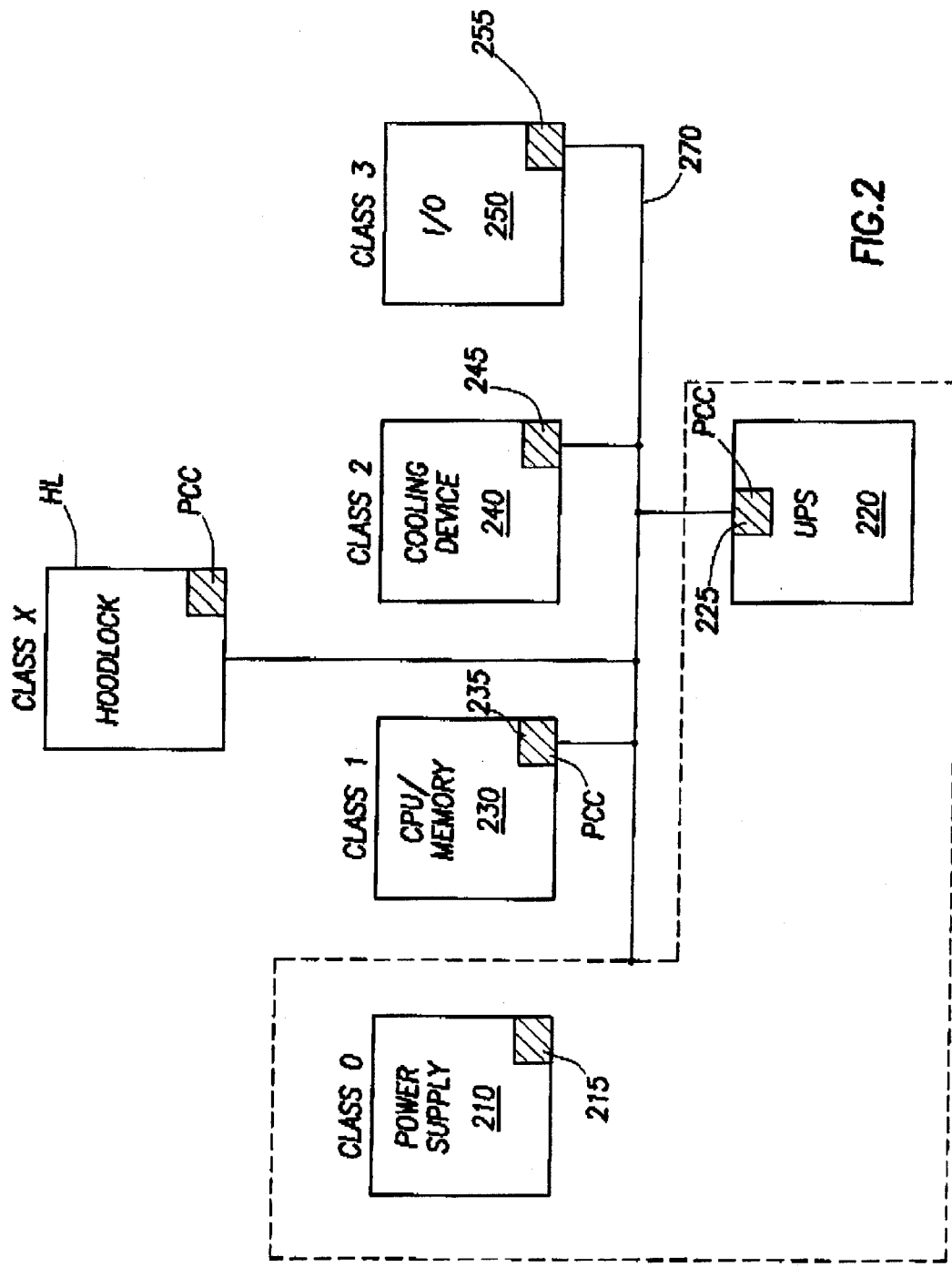
FIG. 2 shows a block diagram of an exemplary computer system according to the preferred embodiment, with system devices divided into different classes.

FIG. 2 shows a block diagram of an exemplary computer system according to the preferred embodiment, with system devices divided into different classes. In this diagram, each device shown incorporates a respective power communications controller (PCC), which communicates over power rail 270. In this example, power supply 210 includes PCC 215 and is designated Class 0. Uninterruptible Power Supply (UPS) 220, which includes PCC 225, may optionally be a unit distinct from the power supply 210, or they may be integrated together, as indicated by the broken box. In this example, Class 1 includes CPU/memory system 230 and PCC 235. Class 2 includes cooling device 240, for example, a fan, and PCC 245. Class 3 includes I/O device 250 and PCC 255. A separate class of device, Class X, includes, for example, a Hoodlock 260 (described in FIG. 1) and a PCC 265. All devices are connected, through their respective PCCs, to power rail 270.

Figure 3:
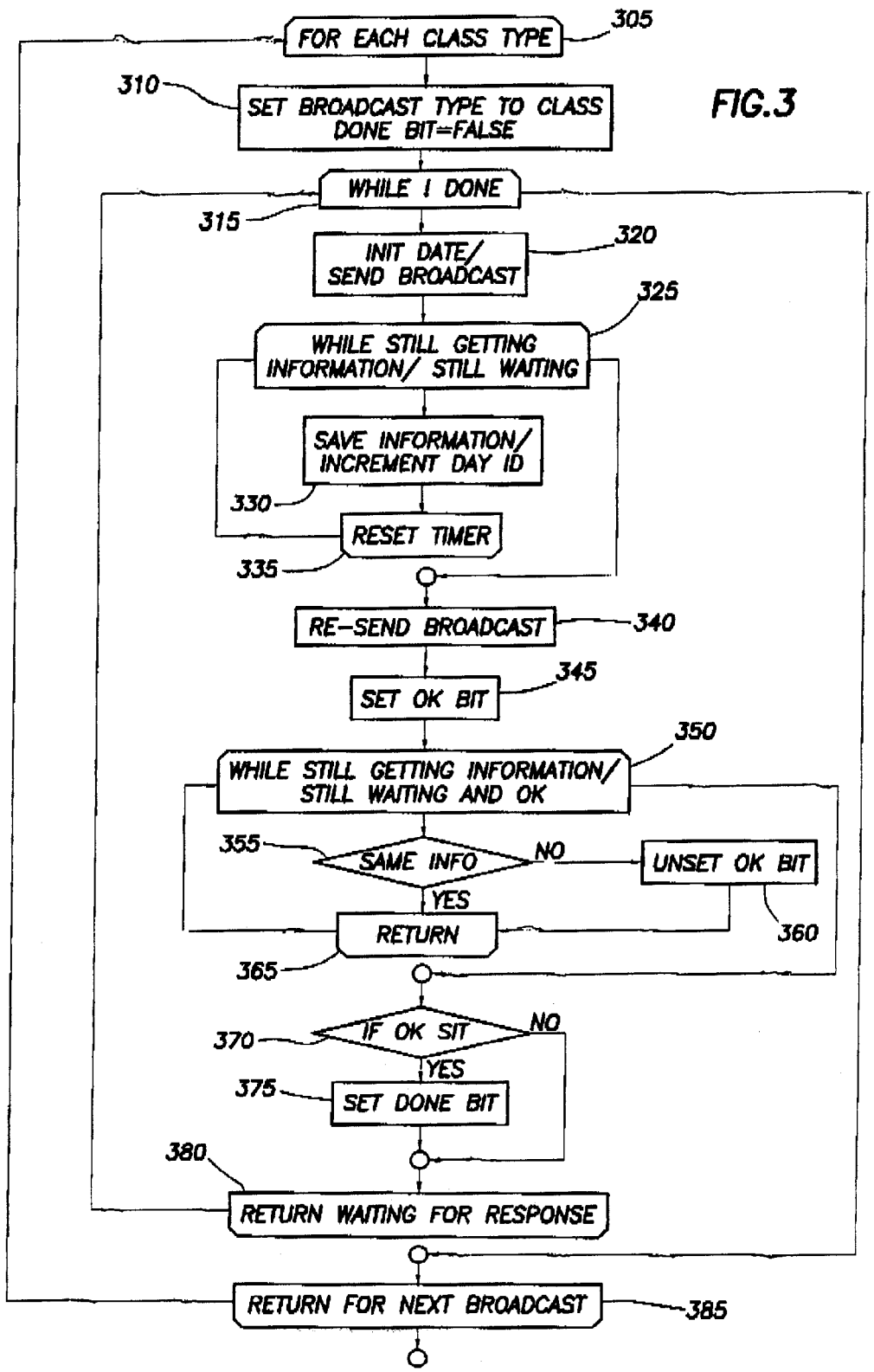
FIG. 3 shows a flow chart of a process according to the preferred embodiment.

FIG. 3 shows a flow chart of a class-based broadcast process according to the preferred embodiment. In this chart, when a command or request is sent to a certain class of device (step 305), the broadcast type is set to "class" and the "DONE" bit is cleared (step 310). Then, as long as the DONE bit remains clear (step 315), a repeated broadcast/verify routine is performed.

First, the broadcast is initialized and sending is initiated (step 320). Then, as long as ACKs are received from devices that have received the broadcast (step 325), the broadcast process continues to wait, saving the list of responding devices as the acknowledgments are received (step 330). As each ACK is received, a delay timer is reset, and the next ACK is waited on (step 335). If the timer expires without receiving another ACK, an assumption is made that the broadcast is done and the initial broadcast loop is left.

Next, the same broadcast is resent (step 340) and an OK bit is set to a default 1 (step 345). The process then waits for device responses as above (step 350, looping at step 365). As the process receives responses, as long as the responses are the same as those received earlier and saved in step 330 (step 355), the looping continues. If anything different is received, the OK bit is cleared (step 360). The process continues after all information is received.

The status of the OK bit (step 370) is checked. If it is set, the DONE bit is then set as well (step 375); if not, the DONE bit is left cleared. The process then loops back (step 380) to step 315. If the DONE bit is set, the routine is finished (step 385) and ready for the next broadcast (looping back to step 305). If the DONE bit is clear, the entire broadcast sequence is retried (looping back to step 315).

Figure 4A:
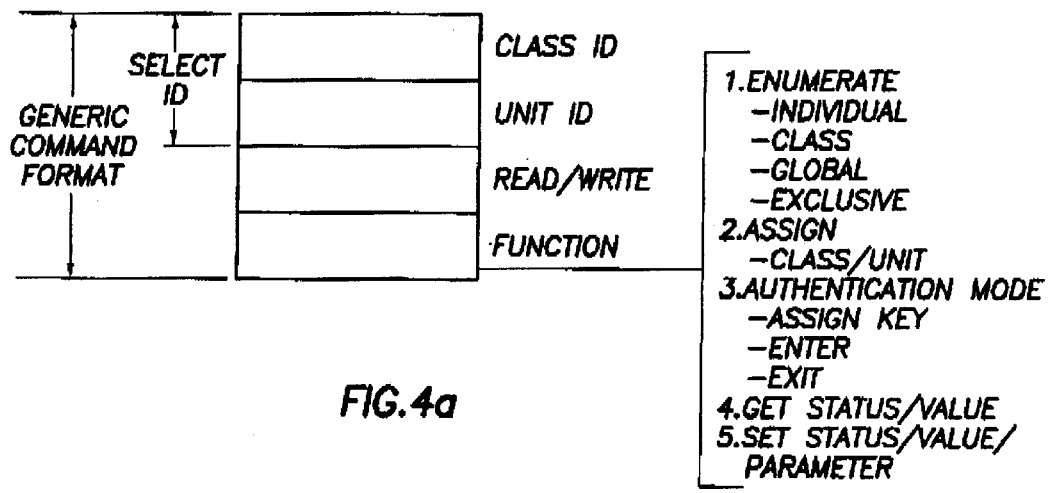
FIG. 4 shows the format of a data/instruction block according to the preferred embodiment.

FIG. 4 shows the format of two data/instruction blocks according to the preferred embodiment. FIG. 4*a* shows a generic command format. In this block, the select ID includes both the device class ID and the unit ID. Next in this block is a read/write bit, indicating the type of transmission. Finally, the function portion of the block indicates the function to be performed.

Figure 4B:
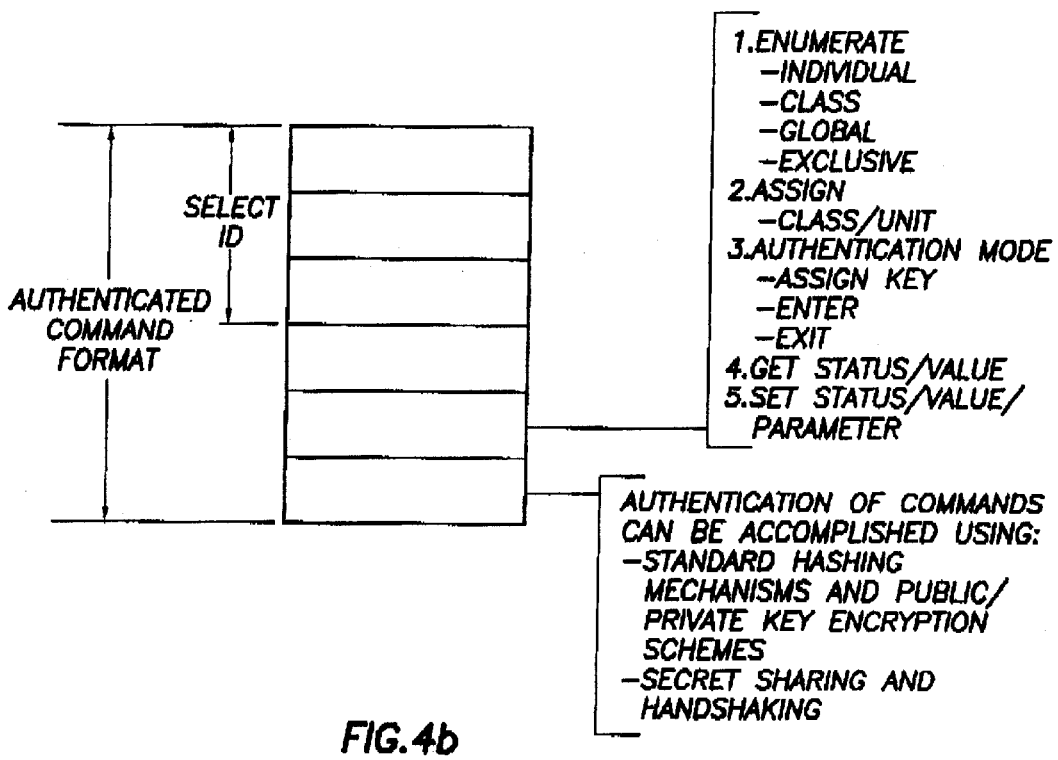

FIG. 4*b* shows an authenticated command format, which is the same as the generic command format with an additional field for authentication. This field contains an authentication code or key, and can support standard hashing mechanisms, public/private key encryption schemes, and secret sharing and handshaking. In the presently preferred embodiment, a Hood Lock/Unlock function would be accomplished via use of an authenticated command sent to the chassis.

Description of Network

Figure 5A:
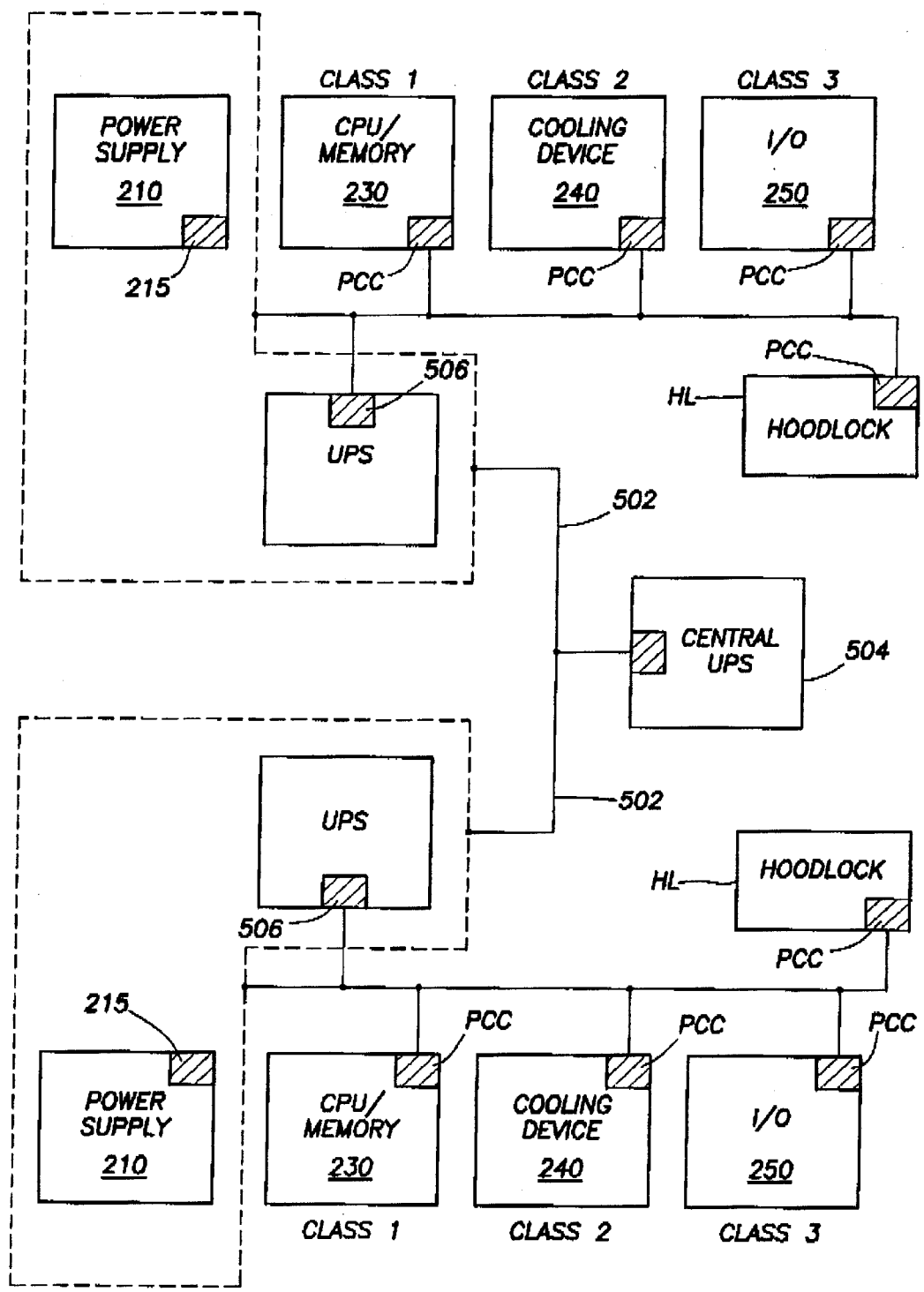
FIGS. 5A and 5B shows a block diagram of a computer system network according to the presently preferred embodiment.
Figure 5B:
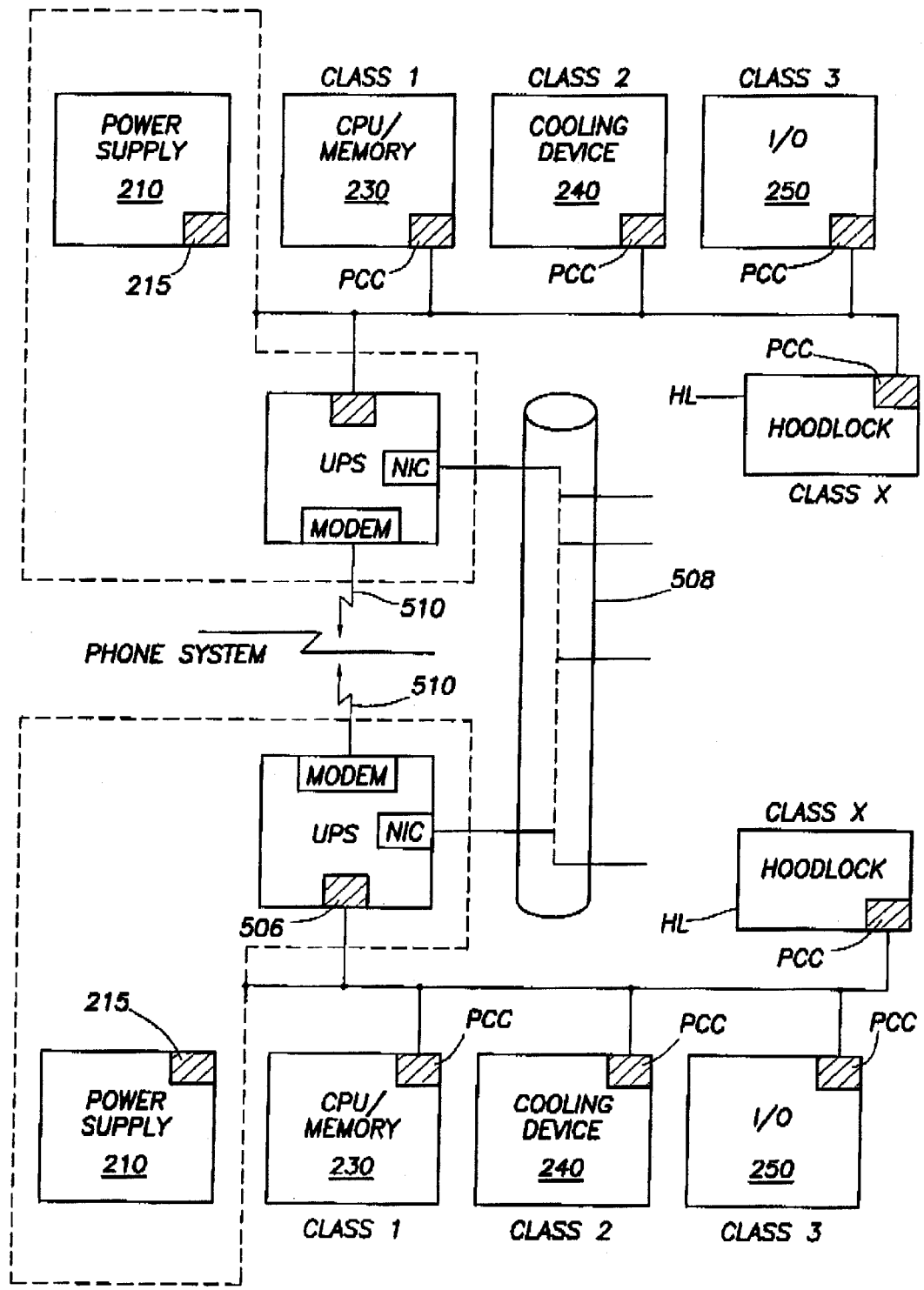

FIGS. 5A and 5B depict block diagrams of a network facilitating interchassis communications. As described above, the preferred embodiment provides a network of nodes, wherein each node is preferably as described above. According to the preferred embodiment, each of the nodes can be linked over a common high speed network or networks, but is also configured to communicate over a common power mains. In FIG. 5A, each chassis is as described in FIG. 2. However, interchassis communication is facilitated by the use of the common power mains 502 as a means for each UPS 220 to communicate. Communication among UPSs 220 and a Central UPS 504 can take place. Therefore, the power mains itself serves as a secondary (or even tertiary) means of communication. Since the power supply of each node incorporates a PCC 215 and each UPS also incorporates a PCC 506 enabling communications over power systems, each node is capable of communicating with each other node over any common power mains. In addition, according to the preferred embodiment, the power supply PCC 215 in each node can act as a bridge to allow communications over the power mains to the individual devices on each node's power rail.

In FIG. 5B an external network 508 is depicted along with a loosely coupled network 510 created by a modem connection across an existing phone system. The phone system acts in the same way as the common power mains. It is capable of relaying command and control functions across existing common phone wires to other nodes on the network.

Even if the primary network is down, the hood of a chassis on a node of the network can still be locked or unlocked.

According to a disclosed class of innovative embodiments, there is provided a computer network, comprising: a plurality of computer systems, each having a user input device, a microprocessor which is operatively connected to detect inputs from said input device, random-access memory which is connected to be read/write accessible by said microprocessor, an output device operatively connected to receive outputs from said microprocessor, and a power supply connected to provide power to said microprocessor and said memory all enclosed in a case; a high-speed network connecting said computer systems and allowing communication therebetween; wherein said computer systems are connected to a power mains, and are capable of communicating therebetween over said power mains; and wherein access to said case is controlled by an electrically controlled device and said device can be commanded to allow access to said case by command and control signals received over said power mains.

According to another disclosed class of innovative embodiments, there is provided a computer system, comprising: one or more microprocessors, a user input device which is operatively connected to provide inputs to at least some ones of said microprocessors, memory which is connected to be read/write accessible by at least some ones of said microprocessors, and an output device connected to receive outputs from at least some ones of said microprocessors; an internal power supply connected to provide power to said microprocessors and said memory, said microprocessors, said memory, and said power supply all being enclosed in a case; a plurality of system devices including a power supply connected to provide power to an internal power rail common to said system devices; and a cooling device connected to cool the interior of said system; wherein said system devices communicate with each other over said power rail; and wherein access to said case is controlled by an electrically controlled device and said device can be commanded to allow access to said case by command and control signals received over said power rail.

According to another disclosed class of innovative embodiments, there is provided system of hardware management in a computer system, comprising: computer system components connected to a power rail, including, a user input device, a microprocessor which is operatively connected to detect inputs from said input device, random-access memory which is connected to be read/write accessible by said microprocessor, and an output device operatively connected to receive outputs from said microprocessor, non-volatile random-access storage which is connected to be read/write accessible by said microprocessor and at least one cooling device; and a power supply connected to a power mains to provide power to said computer system components over said power rail, all said components being enclosed in a case; wherein said power mains facilitates command and control communications between said computer system components and between said computer system components and said power supply; and wherein access to said case is controlled by an electrically controlled device and said device can be commanded to allow access to said case by command and control signals received over said power rail.

According to another disclosed class of innovative embodiments, there is provided a method of hardware security management in a computer network, comprising: operating a plurality of computer systems connected to a high-speed network and a common power mains system; allowing communication between said computer systems across said network and over said common power mains; and controlling access to said computer systems by command and control signals received over said power mains.

According to another disclosed class of innovative embodiments, there is provided a method of hardware security management in a computer, comprising: allowing system devices of a computer to communicate with a power supply and each other over a common power rail; controlling access to said power supply and said system devices by an electrically controlled access device; and electrically controlling said access device by command and control signals received over said power rail.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Of course, in implementing power supply circuits and systems, safety is a very high priority. Those of ordinary skill in the art will therefore recognize the necessity to review safety issues carefully, and to make any changes in components or in circuit configuration which may be necessary to improve safety or to meet safety standards in various countries.

In the sample computer system embodiment the user input devices can alternatively include a trackball, a joystick, a 3D position sensor, voice recognition inputs, or other inputs. Similarly, the output devices can optionally include speakers, a display (or merely a display driver), a modem, or other outputs.

The presently preferred embodiment of this disclosure relies on the CEBus protocol or a modification thereof. However, it is possible that other currently existing protocols, for example, X-10, can be used to achieve substantially similar results. It is also possible that a faster protocol could be developed which can take advantage of the disclosed methods and apparatus.

A secondary network utilizing power mains connectivity is described for the presently preferred embodiment. The topology of this power mains network can vary according to the wiring of the facility or facilities in which it is used. The power mains network, for example, can be hub and spoke, daisy chained, or some other connectivity scheme. In addition, the scope of the network need not be limited to a particular room, circuit, power mains junction box, or building installation. Instead, the service area of the present embodiment extends at least to the detectability distance of the command and control signals. Further, it is possible that the command and control signals can be boosted to increase the service area of the secondary network.

In the presently preferred embodiment, the command and control signals are described as functions implemented in the IPMI platform. However, a modification of the existing IPMI platform, functions from another management platform, a new set of functions, or some combination of functions and platforms can be utilized by the presently preferred embodiment.

Additional general background, which helps to show the knowledge of those skilled in the art regarding the system context, and of variations and options for implementations, may be found in the following publications, all of which are hereby incorporated by reference. In particular, many details may be found in the books from MindShare, Inc., including *Protected Mode Software Architecture, CardBus System Architecture, EISA System Architecture, ISA System Architecture,* 80486 *System Architecture, Pentium Processor System Architecture, PCMCIA System Architecture, Plug and Play System Architecture, PCI System Architecture, USB System Architecture,* and *Pentium Pro Processor System Architecture,* all of which are hereby incorporated by reference, and in the *Pentium Processor Family Developer's Manual* 1997, the *Multiprocessor Specification* (1997), the *Intel Architecture Optimizations Manual,* the *Intel Architecture Software Developer's Manual,* the *Peripheral Components* 1996 databook, the *Pentium Pro Processor BIOS Writer's Guide* (version 2.0, 1996), and the *Pentium Pro Family Developer's Manuals* from Intel, all of which are hereby incorporated by reference.

What is claimed is:

1. A computer network, comprising:

a plurality of computer systems, each having a user input device, a microprocessor which is operatively connected to detect inputs from said input device, random-access memory which is connected to be read/write accessible by said microprocessor, an output device operatively connected to receive outputs from said microprocessor, and a power supply connected to provide power to said microprocessor and said memory all enclosed in a case;

a high-speed network connecting said computer systems and allowing communication therebetween;

wherein said computer systems are connected to a power mains, and are capable of communicating therebetween over said power mains; and wherein access to said case is controlled by an electrically controlled device and said device can be commanded to allow access to said case by command and control signals received over said power mains.

2. The network of claim 1, wherein said communications take place utilizing the CEBus protocol.

3. The network of claim 1, wherein said communications take place utilizing a modified CEBus protocol.

4. The network of claim 1, wherein said command and control signals are network management functions as defined by the IPMI specification.

5. The network of claim 1, wherein said electrically controlled device is a solenoid positioned to positively secure said case unless electrically activated.

6. The network of claim 1, wherein said power mains comprises a secondary network.

7. The network of claim 1, wherein said power mains comprises a secondary network and said high-speed network communicates at a speed at least 10 times that of said secondary network.

8. The network of claim 1, wherein one of said plurality of computer systems generates said command and control signals to control the electrically controlled device of another one of said plurality of computer systems.

9. The computer system of claim 1, wherein said case includes an access door which is secured by said electrically controlled device.

10. The network of claim 1, wherein said electrically controlled device is a solenoid which is spring-loaded into the closed position.

11. The network of claim 1, wherein said computer system has no non-destructive bypass of said electrically controlled device.

12. A computer system, comprising:

one or more microprocessors, a user input device which is operatively connected to provide inputs to at least some ones of said microprocessors, memory which is connected to be read/write accessible by at least some ones of said microprocessors, and an output device connected to receive outputs from at least some ones of said microprocessors;

an internal power supply connected to provide power to said microprocessors and said memory, said microprocessors, said memory, and said power supply all being enclosed in a case;
a plurality of system devices including
a power supply connected to provide power to an internal power rail common to said system devices; and
a cooling device connected to cool the interior of said system;
wherein said system devices, communicate with each other over said power rail; and
wherein access to said case is controlled by an electrically controlled device and said device can be commanded to allow access to said case by command and control signals received over said power rail.

13. The system according to claim 12, wherein said communications take place utilizing the CEBus protocol.

14. The system according to claim 12, wherein said communications take place utilizing a modified CEBus protocol.

15. The system according to claim 12, wherein said command and control signals are network management functions as defined by the IPMI specification.

16. The computer system of claim 12, wherein said electrically controlled device is a solenoid positioned to positively secure said case unless electrically activated.

17. The computer system of claim 12, wherein one of said plurality of system devices generates said command and control signals to control said electrically controlled device.

18. The computer system of claim 12, wherein said electrically controlled device is a solenoid which is spring-loaded into the closed position.

19. The computer system of claim 12, wherein said cooling device is a fan.

20. A system of hardware management in a computer system, comprising:
computer system components connected to a power rail, including, a user input device, a microprocessor which is operatively connected to detect inputs from said input device, random-access memory which is connected to be read/write accessible by said microprocessor, and an output device operatively connected to receive outputs from said microprocessor, non-volatile random-access storage which is connected to be read/write accessible by said microprocessor and at least one cooling device; and
a power supply connected to a power mains to provide power to said computer system components over said power rail, all said components being enclosed in a case;
wherein said power mains facilitates command and control communications between said computer system components and between said computer system components and said power supply; and
wherein access to said case is controlled by an electrically controlled device and said device can be commanded to allow access to said case by command and control signals received over said power rail.

21. The system according to claim 20, wherein said communications take place utilizing the CEBus protocol.

22. The system according to claim 20, wherein said communications take place utilizing a modified CEBus protocol.

23. The system according to claim 20, wherein said command and control signals are network management functions as defined by the IPMI specification.

24. The computer system of claim 20, wherein said electrically controlled device is a solenoid positioned to positively secure said case unless electrically activated.

25. The computer system of claim 20, wherein one of said components or said power supply generates said command and control signals to control said electrically controlled device.

26. The computer system of claim 20, wherein said case includes an access door which is secured by said electrically controlled device.

27. The computer system of claim 20, wherein said electrically controlled device is a solenoid which is spring-loaded into the closed position.

28. The computer system of claim 20, wherein said computer system has no non-destructive bypass of said electrically controlled device.

29. The system according to claim 20, wherein said power mains is a power rail internal to said computer system.

30. The system according to claim 20, wherein said power mains is the power rail of said computer system.

31. The system according to claim 20, wherein said cooling device is a fan.

32. A method of hardware security management in a computer network, comprising:
operating a plurality of computer systems connected to a high-speed network and a common power mains system;
allowing communication between said computer systems across said network and over said common power mains; and
controlling access to said computer systems by command and control signals received over said power mains.

33. The method of claim 32, wherein said power mains comprise a secondary network.

34. The method of claim 32, wherein said power mains comprise a secondary network and said high-speed network communicates at a speed at least 10 times that of said secondary network.

35. The method of claim 32, wherein said communications take place utilizing the CEBus protocol.

36. The method of claim 32, wherein said communications take place utilizing a modified CEBus protocol.

37. The method of claim 32, wherein said command and control signals are network management functions as defined by the IPMI specification.

38. The method of claim 32, wherein said electrically controlled device is a solenoid positioned to positively secure said case unless electrically activated.

39. The method of claim 32, wherein one of said plurality of computer systems generates said command and control signals to control the electrically controlled device of another one of said plurality of computer systems.

40. The method of claim 32, wherein said case includes an access door which is secured by said electrically controlled device.

41. The method of claim 32, wherein said electrically controlled device is a solenoid which is spring-loaded into the closed position.

42. The method of claim 32, wherein said computer system has no non-destructive bypass of said electrically controlled device.

43. A method of hardware security management in a computer, comprising:
allowing system devices of a computer to communicate with a power supply and each other over a common power rail;
controlling access to said power supply and said system devices by an electrically controlled access device; and
electrically controlling said access device by command and control signals received over said power rail.

44. The method of claim 43, wherein said communications take place utilizing the CEBus protocol.

45. The method of claim 43, wherein said communications take place utilizing a modified CEBus protocol.

46. The method of claim 43, wherein said command and control signals are network management functions as defined by the IPMI specification.

47. The method of claim 43, wherein said electrically controlled device is a solenoid positioned to positively secure said case unless electrically activated.

48. The method of claim 43, wherein one of said system devices generates said command and control signals to control said electrically controlled device.

49. The method of claim 43, wherein said electrically controlled device is a solenoid which is spring-loaded into the closed position.

50. A computer, comprising:

a processor;

a case which encloses said processor;

an electronically controlled hoodlock which can be used to lock and unlock said case, and control logic which receives signals via a power rail internal to said computer and which causes said hoodlock to lock and unlock.

51. A computer, comprising:

a processor;

a housing which encloses said processor;

an electronically controlled hoodlock which can be used to lock and unlock said housing, a power supply which supplies power to said processor and which connects to a power mains; and a power communications controller coupled to the power supply;

wherein said power communications controller receives a command via the power mains from a device external to said computer, said command causing the hoodlock to lock or unlock.

* * * * *